D. NOBLE.
EYELET SEWING MACHINE.
APPLICATION FILED OCT. 24, 1911.

1,139,437.

Patented May 11, 1915.
6 SHEETS—SHEET 6.

WITNESSES:

INVENTOR
Donald Noble,
BY
ATTORNEY

UNITED STATES PATENT OFFICE.

DONALD NOBLE, OF BRIDGEPORT, CONNECTICUT, ASSIGNOR TO THE SINGER MANUFACTURING COMPANY, A CORPORATION OF NEW JERSEY.

EYELET-SEWING MACHINE.

1,139,437.     Specification of Letters Patent.    Patented May 11, 1915.

Application filed October 24, 1911. Serial No. 656,463.

*To all whom it may concern:*

Be it known that I, DONALD NOBLE, a subject of the King of Great Britain, residing at Bridgeport, in the county of Fairfield and State of Connecticut, have invented certain new and useful Improvements in Eyelet-Sewing Machines, of which the following is a specification, reference being had therein to the accompanying drawings.

This invention relates to improvements in sewing machines, and important to its object is the improved means employed for giving to the stitch-forming mechanism its cycle of movement for placing the overseam stitches, and for reinforcing the eyelet by the employment of a suitable layer or layers of cord.

While it is old to reinforce a stitched eyelet by using a single cord or by rings composed of metal or fiber, it is believed to be new to employ multiple layers of cord, thereby effecting what is practically an endless reinforcing element which may be more conveniently applied and is less expensive than the earlier forms, and has the additional advantage of permitting the number of layers to be regulated to meet the requirements of fabrics of different texture and the number of plies comprising the body fabric receiving the eyelet.

In the accompanying drawings illustrating the invention, in the several figures of which like parts are similarly designated, Fig. 16 is a central vertical section of the loop-taker standard and cord-carrying eyelet spur.

1 represents the bed-plate of the sewing machine upon which is mounted the bracket arm comprising the arm bracket 2 and standard 3, 4 the main or needle-bar-driving shaft provided with a crank 5, and 6 the hollow needle-bar mounted in an oscillating needle-bar frame 7 on pintle screws, as 8, threaded into the belt-pulley 9 mounted on the upper end of the cylinder 10, said screws passing through suitable openings in said cylinder and entering countersunk notches formed in the frame 7.

The upper half of the needle-bar frame is tubed to correspond to the diameter of the needle-bar and the lower half to receive the bushing 11 in which is mounted the lower end of said needle-bar, said frame carrying oppositely arranged screws, as 12, which pass through said needle-bar frame and are threaded into the bushing 11, the outer ends of said screws extending through openings, as 13, in the cylinder 10 and through oppositely arranged cam slots, as 14, formed in a vertically movable cylinder 15, to be referred to hereinafter.

Figure 12:
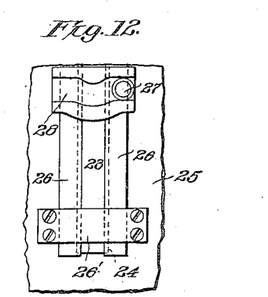
Fig. 12 is a rear side view of a portion of the bracket arm head illustrating the mounting of the needle-bar-actuating slide.

To the needle-bar 6 is rigidly secured a collar 16 provided with a groove 17 into which extend oppositely arranged flanges, as 18, which in turn are secured by screws, as 19, to an annular ring 20 provided with a groove 21 which coacts with a forked arm 22 carried by the needle-bar-actuating slide 23 mounted to move vertically in guideways as 24, (see Fig. 15) formed in the head 25 of the bracket arm, said slide being held against displacement by suitable guide bars, as 26, (see Fig. 12) the upper ends of which enter suitable openings (not shown) formed in said heads, their lower portions being secured by a suitable bracket 26'. Motion is transmitted from the main shaft 4 to said needle-bar-actuating slide through the cam roller 27 entering a cam slot 28 formed in said needle-bar-actuating slide, said roller being mounted upon a stud 29 secured in a flange 30 carried by the main or needle-bar-driving shaft.

Formed in the upper end of the cylinder 15 is an annular groove 33 into which projects a forked arm 34 of a vertically movable bar 35, the upper end of which is mounted in a bearing 36 formed in a bearing cap 37 secured by screws, as 38, the lower end of the bar 35 resting against a vertically movable presser-lifting bar 39, referred to hereinafter.

The bar 35 is provided with an arm 40 carrying a stud 41 which enters an opening 42 formed in the free end of a lever 43 secured upon a rock-shaft 44 mounted in a bearing 45 located at the underside of the bracket arm. The rock-shaft 44 at its forward end is provided with an arm 46 having a slot 47 in which is adjustably secured a stud 48, the inner end of which coacts with a groove 49 formed in a lever 50 pivoted at one end upon a rock-shaft 51 and secured by screw 52 in a bearing 53 formed in the bracket arm, the lever 50 being provided at its lower end with a cam follower 54 which tracks the grooves of the switch cam 55 carried by the main or needle-bar-driving shaft, thus, through the connections 12, 15, 34, 35, 40, 43, 44, 46, 48, 50, 51, 54 and 55, oscillatory movements are transmitted to the needle-bar 6. The rock-shaft 44 is sufficiently long to permit it to be moved in the direction of its length in the bearings 45, for a purpose now to be explained.

56 represents a horizontally arranged rock-shaft mounted in suitable bearings forming a part of the bracket arm, said shaft being provided at its forward end with a suitably secured collar 57 to prevent endwise movement in a direction away from the front of the machine, and on the side of the front bearing of the shaft 56 opposite the collar 57 is secured a lever 58, the lower end of which acts upon the rear end of the rock-shaft 44 to move it in opposition to the resiliency of the spring 59 in a direction to disconnect the stud 48 from the groove 49 when it is desired to discontinue the vertical movements of the cylinder 15, and to effect this the horizontal shaft 56 is provided with a depending lever 60 having its lower end connected by a link 61 with a rock-lever 62 pivoted upon a stud 63 secured in the arm standard, a spring 64 acting through the link 61 to resiliently hold the lower end 84 of the lever 62 in operative relationship with the stitch-changing cam disk 65, which latter acts upon the elements 62, 61, 60 and 64 to hold the lever 58 out of operative relationship with the end of the shaft 44 except at such time as it is desired to discontinue the horizontal movements of the cylinder 15.

66 represents a feed-shaft journaled at one end in a bearing 67 formed in the arm standard, its opposite end being journaled in a bearing 68 formed in the bracket 69 extending out from the inner wall of said standard. Upon the shaft 66 is secured a standard ratchet disk 70, of ordinary construction, which is actuated through the stitch-regulating connections, as 71, from an eccentric 72 carried by the main shaft 5. The shaft 66 carries at its opposite end a gear pinion 73 which coacts with a gear wheel 74 journaled upon a stud 75 secured by a nut 76 in the standard 4, said pinion and gear wheel being of the ratio of two to one, thus giving to the latter one revolution to two of said pinion.

The disk 65 secured to the gear wheel 74 is provided with a rim 77, a portion of which is cut away to form a notch or wall 78 and a straight portion 79 extending from said wall to the point 80, from which point said rim is provided with an inclined portion 81 extending to the point 82 or directly opposite the wall 78. The end 84 of the lever 62 is attached to the latter by a spring plate 84' which permits said end to yield in a direction transverse to its oscillatory movements, for a purpose later to be explained.

Aside from the means for controlling its time of action, the stop-motion mechanism herein employed is of common construction, and it has been deemed sufficient to designate the principal elements illustrated by the numeral 85.

Referring to the means for controlling the time of action of the stop-motion mechanism, 85' represents a shifting lever which is mounted to oscillate on a bearing 86 forming a part of the standard 3 and held against displacement by a screw 38, the forward end of said lever being provided with the usual cam slot 89 into which projects the regularly employed stud 89' from the lever 88' for operatively connecting the lever 85' with the stop-motion elements mounted on the main shaft 5. The spring 90' acts upon the lever 85' to hold the commonly employed brake (not shown) in effective relationship with the periphery of the brake disk 90 frictionally connected with the machine belt pulley 91', a collar 91 carried by the manually actuated treadle rod 92 acting, at the will of the operator, and in opposition to the resiliency of the spring 90', to oscillate said lever in an opposite direction or in a direction to release the brake, thus permitting the machine to be actuated as in the earlier devices.

Figure 11:
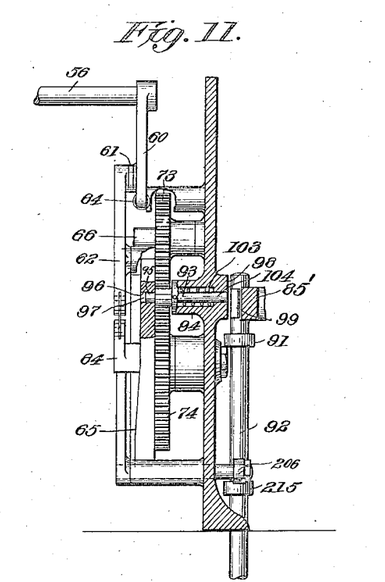

93 represents a plunger mounted in a hub 94 formed integral with the arm standard, said plunger, when the machine is at rest, occupying the position shown in Fig. 11 with its inner end 95 in contact with the wall 96 of the opening 97 formed in the cam disk 65 and its outer end flush with the outer face 98 of the hub 94, at which time the lever 85' occupies its position for holding the machine inoperative.

On the inner side of the lever 85' is slidably mounted a bar 99 normally held by a spring 100 in its outward position (see Fig. 14), said bar being provided with a cam plate 101 which, as will now be explained, coacts with the outer end of the plunger 93 to lock the lever 85' in brake releasing position, thus permitting the machine to be actuated.

Figures 13, 14, 15:
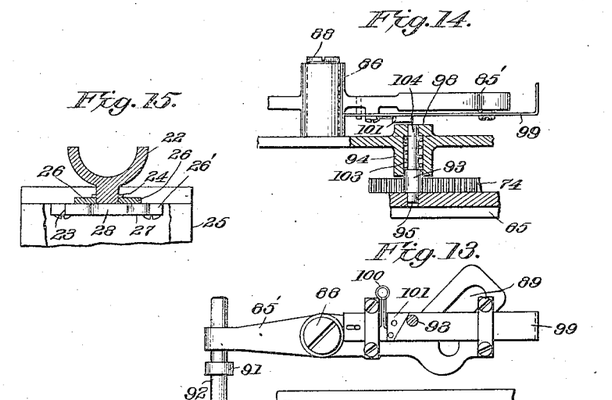
Figs. 13 and 14 illustrate certain details of the mechanism for controlling the time of action of the stop-motion mechanism.
Fig. 15 is a cross-section of the needle-bar-actuating slide and sufficient of the bracket arm head to show their operative relationship.
Figure 18:
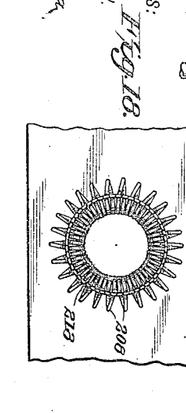
Fig. 18 is a view of a stitched eyelet, the product of the improved machine.

To start the machine the operator, through the manipulation of the treadle rod 92, oscillates the lever 85' to position the stud 89' in the upper end of the cam slot 89, which effects the release of the brake and starts the machine, and in the rotation of the cam disk 65 the inclined portion 102 forces the plunger 93 outward in opposition to the resiliency of the spring 103, causing the forward end 104 of said plunger to be positioned directly above the upper edge of the plate 101 carried by the bar 99, thus locking the lever 85' against reverse oscillation, or in a direction to automatically arrest the action of the machine until, by the rotation of the cam disk 65, the plunger 93 again enters the opening 97. In case it is desired to bring the machine to rest between the commencement and completion of the eyelet, the operator moves the bar 99 endwise in opposition to the resiliency of the spring 100, thus causing the plunger to drop off from the upper edge of the plate 101, as shown in Fig. 13.

105 represents a bracket adjustably secured by screws, as 106, to the lower side of the sewing machine bed-plate, said bracket at its lower end being provided with a bearing 107 in which is fitted a bushing 108 extending slightly above said bearing.

109 represents a hollow looper-carrier standard which, at its lower end, passes through the bushing 108 and is held against upward movements by nuts, as 110, a step bracket 111 mounted upon said standard and secured by pinch screw 112 acting to hold said standard against downward movement. The standard 109 carries at its upper end a belt-pulley 113 provided with a recess 114 in which is secured by screw 115 the standard extension 116 journaled in a bearing 117 formed in the cloth-plate 118, said extension being provided with a throat or needle plate 119.

120 represents a screw-threaded loop-taker-carrier journaled at its upper end in the pulley 113, its opposite end being mounted to oscillate upon a pintle screw 121 secured by a nut 122 in the step bracket 111, said carrier having secured to its upper end the loop-taker 123.

124 represents a horizontally arranged looper-actuating lever provided at its rear end with arms, as 125, into which project the respective pintle screws 126 secured by the respective pinch screws, as 127, in the respective lugs, as 128, extending from the bed-plate 1, the forward end of said lever being forked to embrace the looper-actuating disk 129 provided with a groove 130 into which extend followers, as 131, carried by the respective arms comprising said forked ends.

The looper-actuating disk 129 is mounted to move vertically on the oscillating hollow standard 109, and to guard said disk against any tendency to bind upon said standard, there is provided a bushing 132 held in sliding relationship with the inner wall of said standard by screws, as 133, which pass through a hub 134 and through suitable slots, as 109', formed in said standard and are threaded into said bushing. The disk 129 is given its vertical movements through the crank 5, crank connection 136, oval bearing 137 and lever 124, thus, through the action of the threaded opening (not shown) in the disk 129 through which the member 120 passes, oscillatory stitch-forming movements are transmitted to the loop-taker 123.

Figures 1, 17, 19:
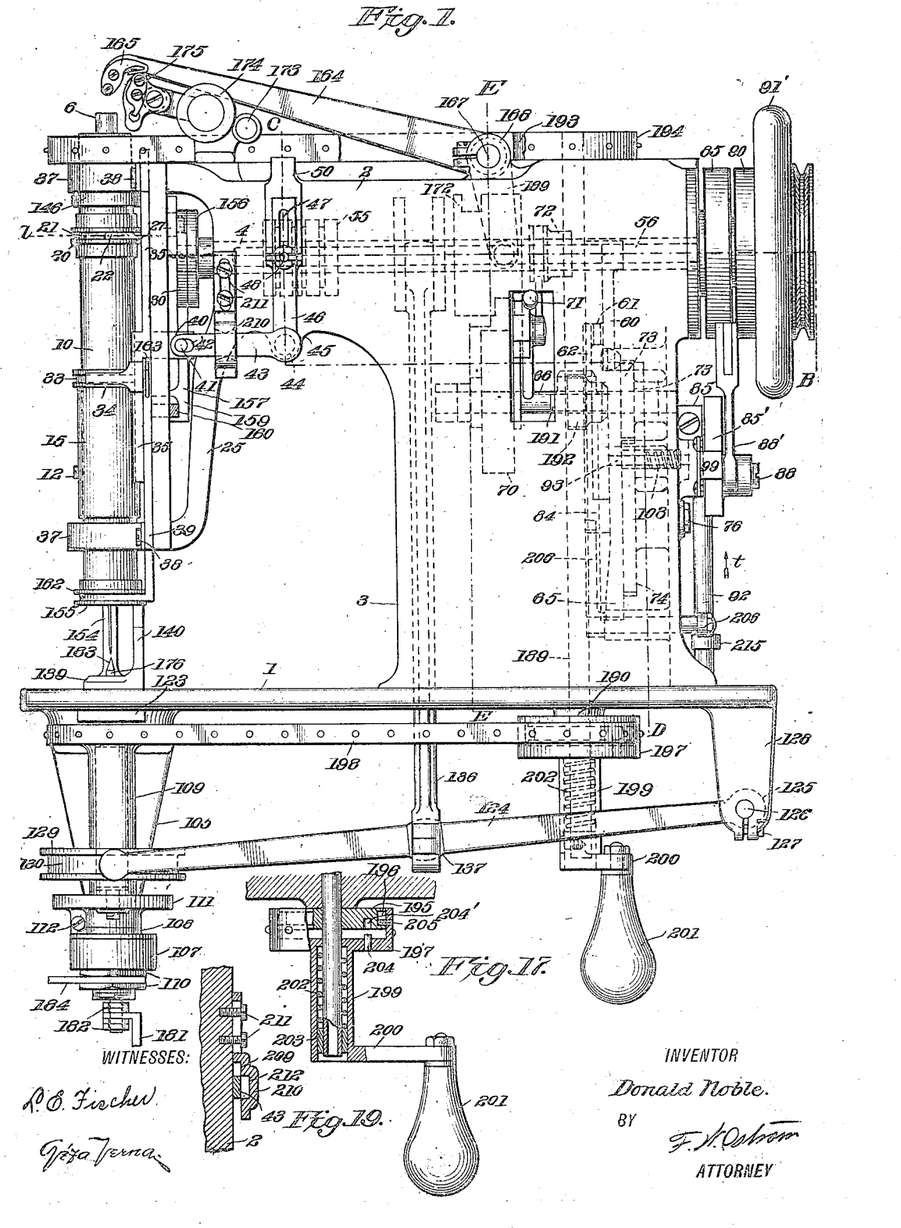
Figure 1 is a view in front side elevation of the improved eyelet sewing machine illustrating, mainly in dotted lines, the elements inclosed within the bracket arm.
Fig. 17 is a detail view, partially in full lines and partially in section of the crank-shaft actuating mechanism.
Fig. 19 is a view in section of a portion of a head of the bracket arm and the needle-registering bracket, the latter of which is shown in front side elevation, Fig. 1.
Figures 2, 10:
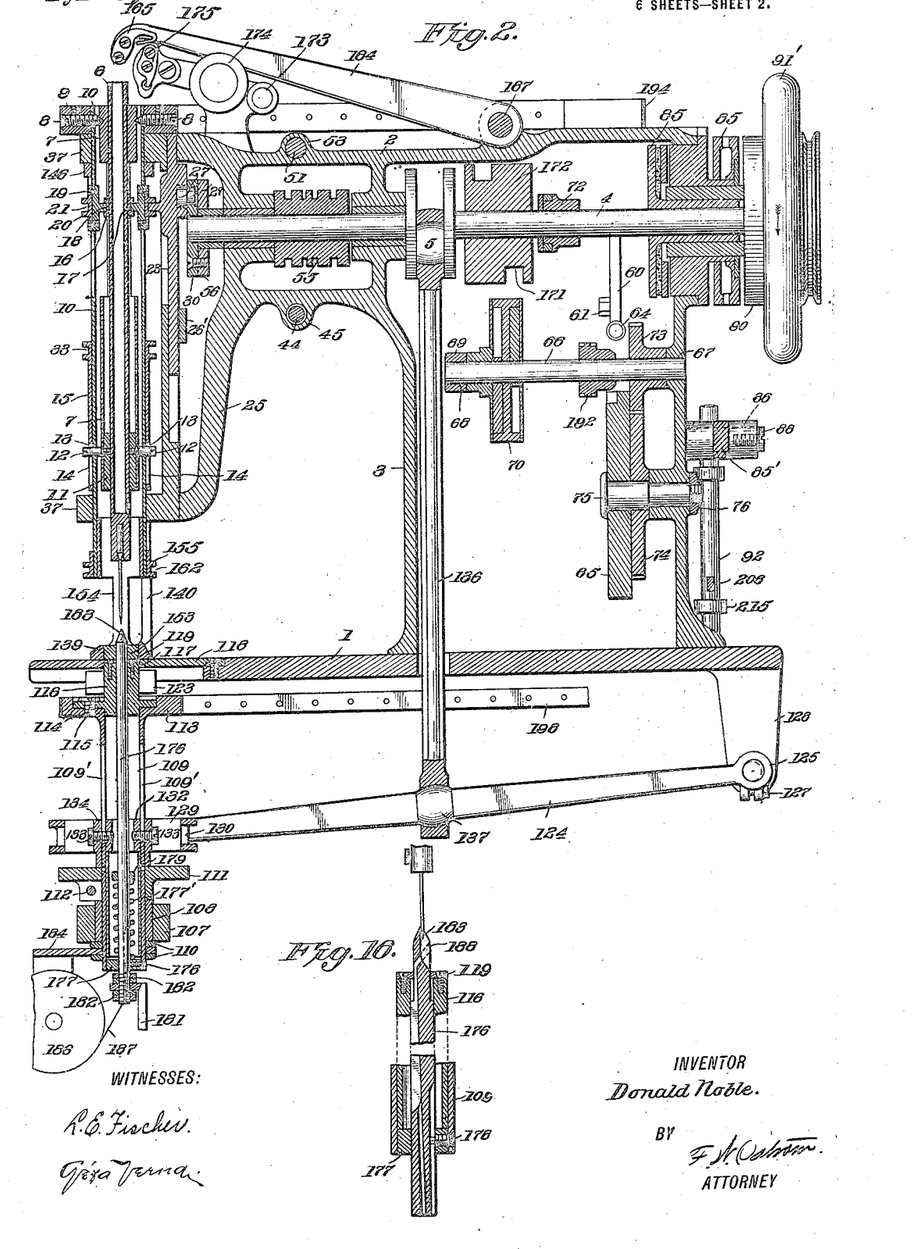
Fig. 2 is a view of Fig. 1, substantially in vertical central section, certain elements being shown in full lines and others omitted to better illustrate the relative action of the more important elements.
Figs. 10 and 11 are end and front side elevations, respectively, of certain coacting elements, having to do mainly with the stitch-changing mechanism.
Figure 3:
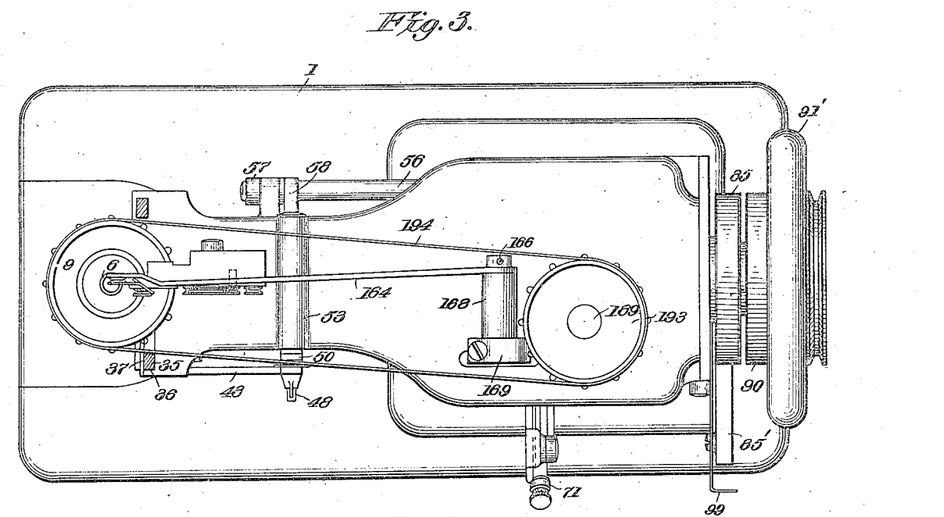
Fig. 3 is a plan view of Fig. 1.
Figure 4:
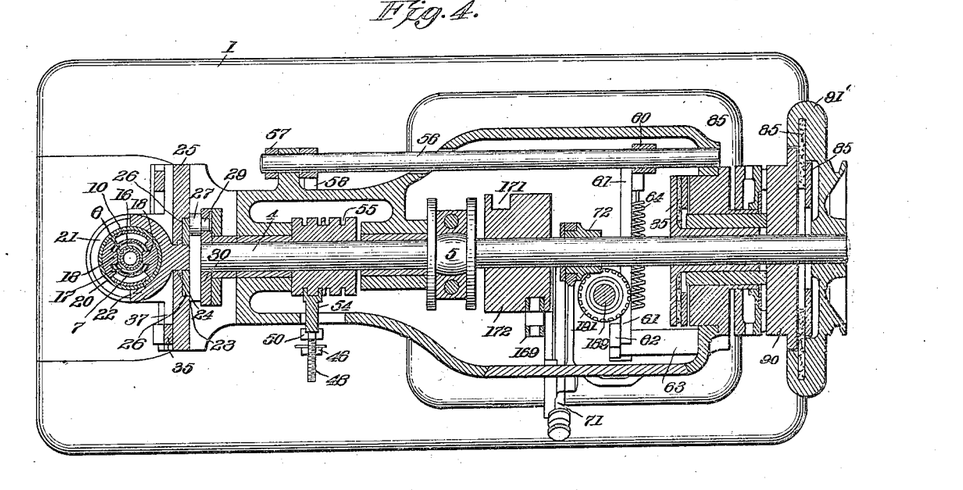
Fig. 4 is a sectional plan view on the lines A—B, Fig. 1, showing the main shaft adjusted a quarter turn slower than in the last mentioned figure.
Figure 5:
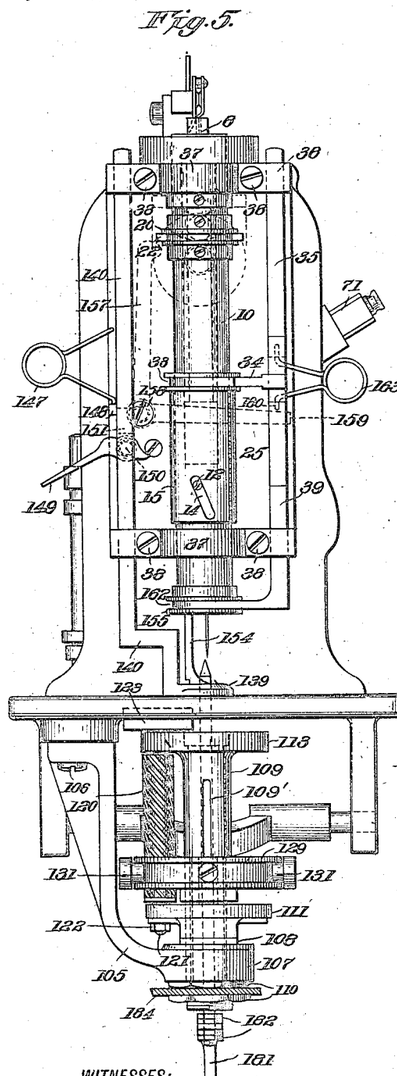
Fig. 5 is a front end elevation of Fig. 1.
Figure 6:
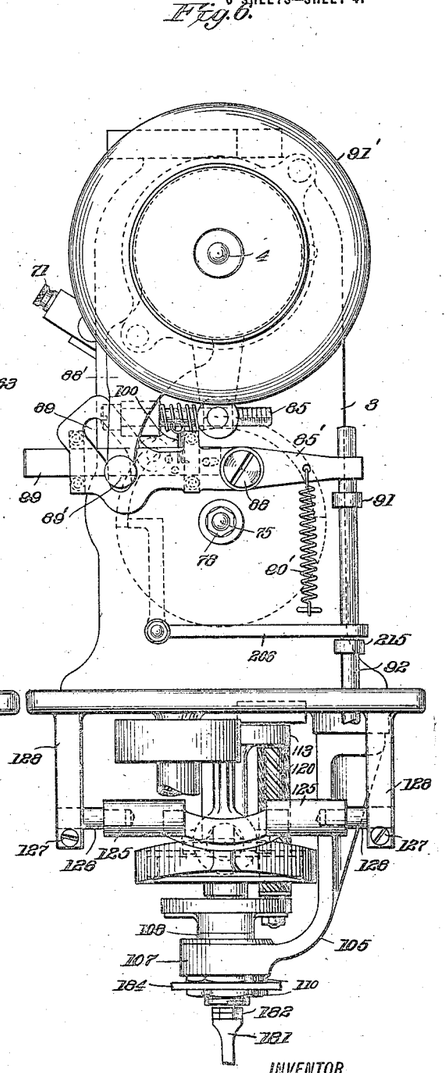
Fig. 6 is a rear end elevator of Fig. 1.
Figure 7:
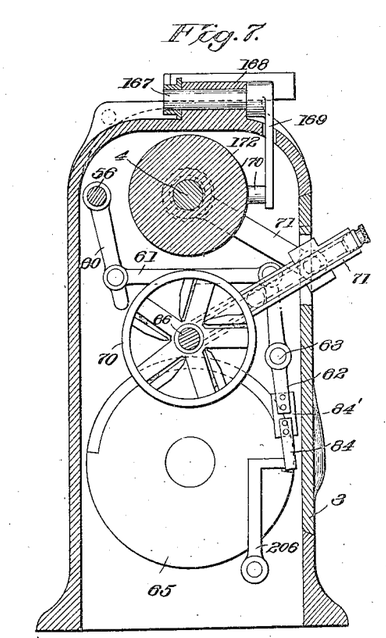
Fig. 7 is a section on the line E—E, Fig. 1, looking toward the rear end of the machine.
Figure 8:
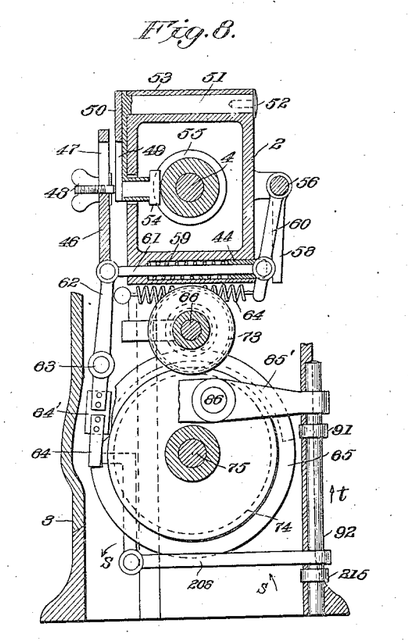
Fig. 8 is a section on the lines C—D, Fig. 1, looking toward the front end of the machine.
Figure 9:
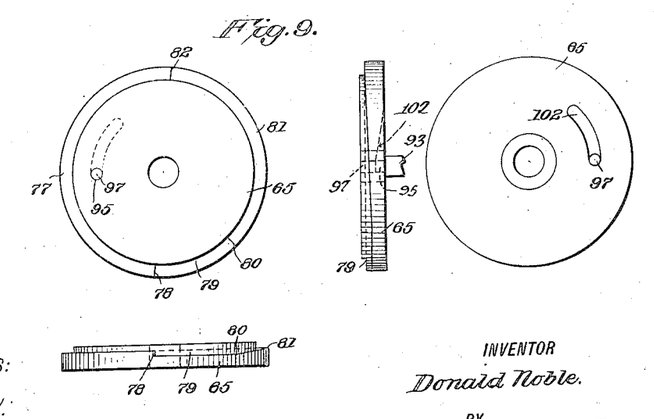
Fig. 9 comprises peripheral and reverse side views of the stitch-changing cam disk.
Figure 10:
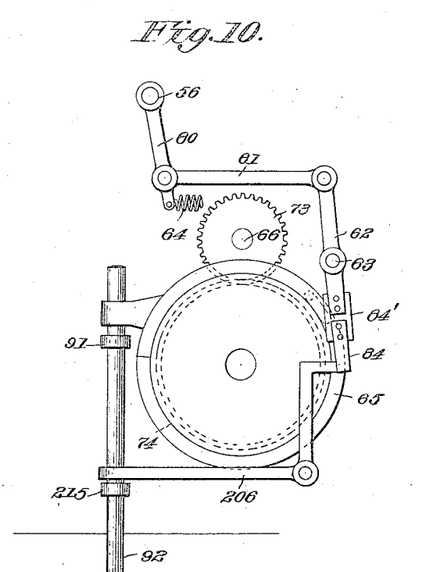

To hold the fabric stationary during the stitching operation, there is provided a cloth-presser 139 which, in the present instance, is formed integral with the cloth-presser bar 140 (see Fig. 5) which is mounted in suitable bearings formed in the head 25 and held against displacement by the bearing caps 37. The cylinder 10 at its upper end is journaled in a suitable bearing formed in the cap 37 and at its opposite end in the like cap 37, and is held against movement in the direction of its length by the belt-pulley 9 and a suitably secured collar 146 arranged on opposite sides of the upper of the bearing caps 37.

For holding the cloth-presser 139 down upon the fabric during the stitching operation, there is provided a cloth-presser-bar spring 147 mounted at one end in a suitable opening formed in the head 25 and at its opposite end in a suitable opening formed in the lug 148 carried by the bar 140, a hand lever 149 pivoted on a screw 150 secured in said head acting upon a lug 151 carried by the bar 140 to lift said cloth-presser away from the fabric at the will of the operator, when for any purpose it is desired to manually adjust said fabric under the needle.

When stitching eyelets in comparatively thin materials, it is desirable that the fabric be held down upon the needle-plate directly about the spur rod 176, and to this end there is provided an auxiliary cloth-presser 153 carried by a depending bracket 154 forming a part of the ring 155 slidably mounted on the cylinder 10. To cause the auxiliary cloth-presser 153 to be lifted from the fabric at such time as the stitch-forming mechanism is given its step-by-step rotary movement to form the successive stitches, the main shaft 4 is provided with a cam 156 which actuates a bell-crank lever 157 (see dotted lines, Fig. 5) pivoted upon a screw 158 threaded into the head 25, and the end 159 of said lever coacts with a lug 160 carried by the presser-lifting bar 39 forked at its lower end to coact with a groove 162 formed in the ring 155, a spring 163 acting to hold the cloth-presser 153 down upon the fabric when released from the control of the cam 156.

The needle-thread take-up 164 is provided at its forward end with a thread-leader 165 of ordinary construction and at its opposite end is secured, by screw 166, upon a rock-shaft 167 journaled in suitable bearings formed in the lug 168, the opposite end of said rock-shaft carrying a lever 169 provided with a stud 170 which tracks a cam-groove 171 of the take-up cam 172 carried by the shaft 4.

In the threading of the machine, the needle-thread is passed from the supply through the thread-check 173, tension disk 174, thread-leader 175 and through the leader 165 to the hollow needle-bar 6, after which it is passed through the needle eye.

176 represents a tubular spur rod mounted to move vertically in the standard 109, its upper end being slidably mounted in the standard extension 116 and its opposite end in a bushing 177 secured in said standard by screw 178, which latter also acts to hold said spur rod against rotation independent of the standard 109, a spring 177' seated at one end on the bushing 177 and with its opposite end in contact with the collar 179 acting to hold said spur rod in its normal or elevated position.

181 represents a treadle rod (the upper portion only of which is shown) secured by jam nuts, as 182, to the lower end of said spur rod; said treadle rod, through suitable and well-understood manually-actuated means (not shown) acting, at the will of the operator, to move said spur rod downward sufficiently to place the spur 183 out of interference with the manual manipulation of the fabric, as when placing or readjusting the latter in effective relationship with the means for forming stitches.

184 represents a bracket secured to the standard 109 by the nuts 110, and in said bracket is mounted a cord supply 186 from which a suitable cord, as 187, is passed up through the hollow spur rod and out through an opening 188 formed in the spur 183, for a purpose later to be explained.

189 represents a rotary crank shaft mounted at its upper end in a suitable bearing formed in the bracket arm, and at its lower end in a bearing 190, said shaft carrying a spiral gear 191 which meshes with a spiral gear 192 carried by the feed-shaft 66. To the upper end of the shaft 189 is secured a belt-pulley 193 connected by a belt 194 with the pulley 9, and near the lower end of said shaft is suitably secured a disk 195 provided with a groove 196, and upon said disk is mounted a belt-pulley 197 connected by a belt 198 with the pulley 113, thus, through the eccentric 72, connections, as 71, and ratchet disk 70, step-by-step rotary movements are transmitted from the main shaft 4 to the cylinder 10, standard 109 and parts carried by said cylinder and standard.

The pulley 197 is recessed for the reception of the disk 195 and, in the present instance, is formed integral with the hollow shaft 199 and crank bar 200, the latter of which carries a crank handle 201. 202 is a spring seated at its lower end upon a collar 203 secured to the shaft 189 and acting on the pulley 197 to hold its pin 204 in engagement with a suitable opening 204' formed in said disk, thus causing the pulley 197 to be rotated by the action of the shaft 189. When, for a purpose later to be explained, it is desired to manually rotate the standard 109 independently of the rotary movements of the cylinder 10, the operator, in opposition to the resiliency of the spring 202, positions the pulley 197 with its pin 204 out of engagement with the disk 195, thus leaving said pulley free to rotate said standard. The screw 205 secured in the pulley 197 acts to limit the downward movement of the latter by its inner end contacting with the lower wall of the groove 196.

In the operation of the machine, supposing the fabric to be positioned under the needle and the spur extending up through the eyelet opening, and it is desired to reinforce the eyelet by the application of a cord, the operator, before positioning said fabric, draws the cord out so that it will lie beneath the fabric and extend out from under the cloth-presser, disconnects the pulley 197 from the disk 195 and, through the manual manipulation of the crank handle 201, winds the cord about the spur rod one or more turns, as the nature of the product may require, when the machine will be ready for effective action. When about to commence the stitching operation the operator, through the manipulation of the foot treadle, moves the rod 92 in the direction indicated by the arrow $t$ and in doing so first causes the collar 215 to rock the bell-crank lever 206 in the direction indicated by the arrow $s$, which causes the free end of said lever to lift the free end 84 of the lever 62 in line with the periphery of the stitch-changing cam 65, and the further action of said rod causes the collar 91 to rock the lever 85' to start the machine in action, followed by the free end of the lever 84 riding the periphery of said cam until it reaches the wall 78, during which time the overseam stitches 208 have been formed, when the free end 84 of the lever 62 drops off from the wall 78 and thus, through the connections pointed out, the lever 58 is caused to move the shaft 44 endwise, which carries the pin 48 out of operative relationship with the slot 49 in the vibrating lever 50 and forces the lever 43 in contact with the wall 209 of the needle-registering bracket 210 secured by suitable screws, as 211, to the head of the bracket arm; and as the switch cam 55 vibrates the lever 43 in line with the notch 212 in said registering bracket, said lever acts to lock the cylinder 15 against vertical movements and positions the needle for making the intermediate line 213 of circular stitches in any desired position, dependent upon the adjustment of the registering bracket 210, and as soon as the line 213 is completed the stop-motion mechanism is brought into action to arrest the action of the machine.

Claims:—

1. In a sewing machine, the combination with a stitch-forming mechanism and means for changing the relative position of the latter and the fabric being acted on to effect circularly arranged stitches, of a fabric spur, and means for giving to the latter rotary movements independent of and prior to the stitching operation to provide said circularly arranged stitches with a reinforcing element.

2. In a sewing machine, the combination with a stitch-forming mechanism including a needle-bar provided with an opening within its diameter for the passage of a needle thread, and means for changing the relative positions of the needle-bar and the fabric being acted on to effect circularly arranged stitches, of a fabric spur, and means for giving to the latter rotary movements independent of and prior to the stitching operation to provide said circularly arranged stitches with a reinforcing element.

3. In a sewing machine, the combination with a stitch-forming mechanism and means for changing the relative position of the latter and the fabric being acted on to effect circularly arranged stitches, of a spur rod provided with a fabric spur and with an opening located within the diameter of said rod for the passage of a cord, and means for giving to said rod rotary movements independent of and prior to the stitching operation to provide said circularly arranged stitches with a reinforcing element.

4. In a sewing machine, the combination with a stitch-forming mechanism including a needle-bar provided with an opening within its diameter for the passage of the needle thread, and means for changing the relative positions of the needle-bar and the fabric being acted on to effect circularly arranged stitches, of a spur rod provided with a fabric spur and with an opening located within the diameter of said rod for the passage of a cord, and means for giving to said rod rotary movements independent of and prior to the stitching operation to provide said circularly arranged stitches with a reinforcing element.

5. In a sewing machine, the combination with a stitch-forming mechanism and means for changing the relative positions of the latter and the fabric being acted on to effect circularly arranged stitches, of a rotary looper carrier standard provided with a spur rod terminating in a fabric spur, and means for giving to said standard rotary movements independent of and prior to the stitching operation to provide said circularly arranged stitches with a reinforcing element.

6. In a sewing machine, the combination with a stitch-forming mechanism including automatically controlled means for changing the character of the seam during the stitching operation, and means for changing the relative positions of said stitch-forming mechanism and the fabric being acted on to effect circularly arranged stitches, of a fabric spur, and means for giving to the latter rotary movements independent of and prior to the stitching operation to provide said circularly arranged stitches with a reinforcing element.

7. In a sewing machine, the combination with a stitch-forming mechanism including a stitch-changing cam disk for changing the character of the seam during the stitching operation, and means for changing the relative positions of the stitch-forming mechanism and the fabric being acted on to effect circularly arranged stitches, of a fabric spur, and means for giving to the latter rotary movements independent of and prior to the stitching operation to provide said circularly arranged stitches with a reinforcing element.

8. In a sewing machine, the combination with a stitch-forming mechanism and means including a ratchet disk for changing the relative positions of the stitch-forming mechanism and the fabric being acted on to effect circularly arranged stitches, of a fabric spur, and means for giving to the latter rotary movements independent of and prior to the stitching operation to provide said circularly arranged stitches with a reinforcing element.

9. In a sewing machine, the combination with a stitch-forming mechanism including a stitch-changing cam disk for changing the character of the seam during the stitching operation, and means including a ratchet disk for changing the relative positions of the stitch-forming mechanism and the fabric being acted on to effect circularly arranged stitches, of a fabric spur, and means for giving to the latter rotary movements independent of and prior to the stitching operation to provide said circularly arranged stitches with a reinforcing element.

10. In a sewing machine, the combination with a stitch-forming mechanism including a stitch-changing cam disk for changing the character of the seam during the stitching operation, and means including a ratchet disk for changing the relative positions of the stitch-forming mechanism and the fabric being acted on to effect circularly arranged stitches, of a rotary looper carrier standard provided with a spur rod terminating in a fabric spur, and means for giving to said standard rotary movements independent of and prior to the stitching operation to provide said circularly arranged stitches with a reinforcing element.

In testimony whereof, I have signed my name to this specification, in the presence of two subscribing witnesses.

DONALD NOBLE.

Witnesses:
ABBIE M. DONIHEE,
WILLIAM R. ABERCROMBIE.